Patented Nov. 11, 1930

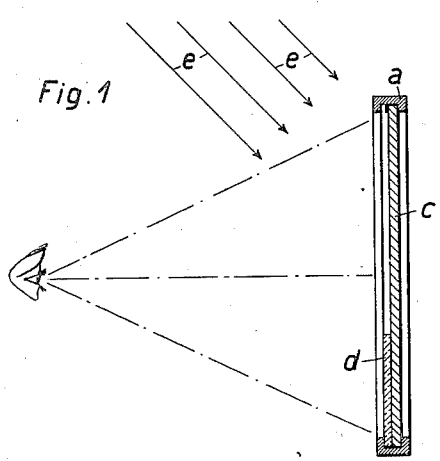
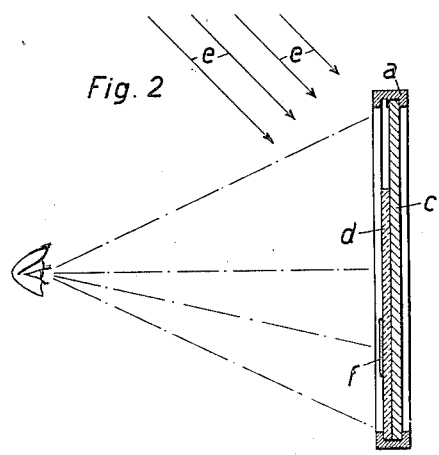
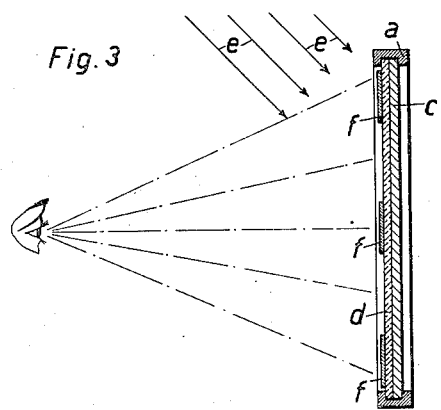
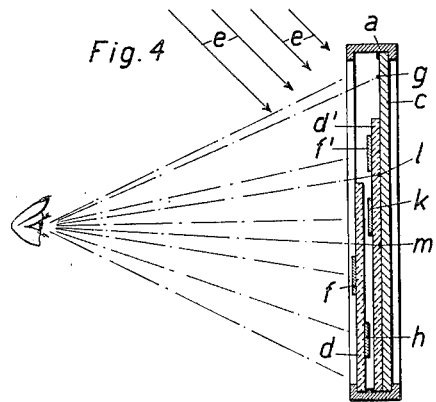
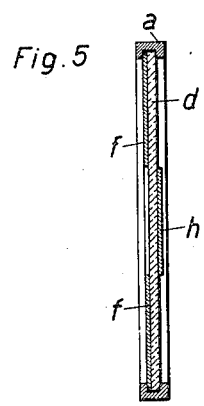
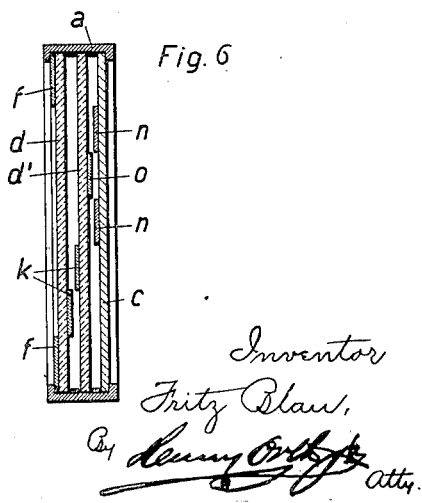

1,781,313

UNITED STATES PATENT OFFICE

FRITZ BLAU, OF BERLIN-CHARLOTTENBURG, GERMANY

PICTURE

Application filed October 22, 1928, Serial No. 314,102, and in Germany November 3, 1927.

My invention relates to pictures of the type disclosed in my United States Patent No. 1,640,230, dated August 23, 1927, in which pictures are described having exceptionally large contrast of brilliancy. This is attained by producing exceptionally dark portions in the painting, the so-called over-dark portions which are multiple dark as compared with the darkest pigments.

The present invention is an improvement on that type of painting.

In this invention the so-called over-dark portions of the picture are produced in a new manner. The directed light for illuminating the picture must, as far as the dark portions are concerned, twice pass through a completely clear, but uniformly dark sheet, preferably, a gray sheet, first from the source of light to the parts of the picture that shall show dark and then reflected through such sheet from the dark portions to the eye of the observer. In this manner the over-dark portions compared with the light portions which are not covered by the dark sheet produce a greater contrast than when colors are used in the customary manner. The colors that are bright or light need not be covered by the gray sheet either by not allowing this sheet or screen to cover them or by placing them on the outer surface of the sheet viewed by the observer.

The picture may be for example on cloth or paper or any other supporting surface. The picture is covered for example by a plate of glass, celluloid or the like, that is colored gray but in any case shall be clear or transparent. The outer face of the covering sheet, glass, celluloid or the like is painted or printed with those portions of the picture, that shall be materially lighter or brighter than the other portions.

The source of light will be such that the illuminating rays shall strike the picture at an incline, preferably from above and those portions of the picture that show light and are on the outer face of the gray glass, or the like, will be seen by the observer in their full brilliancy.

On the other hand the pigments at the rear of the gray glass will be as dark as desired depending upon the absorption of the light by the clear gray glass on its way to and from the picture.

If a clear gray sheet of glass be used whose absorption of light is about 60% and its transmission about 40%, then the brilliancy of the colors behind the glass by reason of the first incident and inclined rays passing through the glass and the almost perpendicular returning rays will reduce the brilliancy of these colors to about one-tenth the brilliancy that they have without the glass in front of them.

With other coefficients of absorption of the gray glass greater variation may be obtained.

In such a construction the observer will see the darkest portion of the picture behind the clear, gray plate, which may have but one twentieth the contrast from the lightest portion, a contrast of but one-two-hundredth of the brilliancy of the brightest portion of the picture painted on the front surface of the plate.

Two or more such gray plates may be used for a picture and having each preferably a lesser absorption; each sheet or plate having either the same degree or different degrees of absorption and the lighter colors of the picture placed on the face of the front gray plate, a second portion of the picture between the plates either on the back of the first plate or the face of the next succeeding plate and finally a third portion of the picture on the back of the second plate or on any other support as canvas, paper etc.

In this manner the making of pictures having contrasts between the lightest and darkest portions that are greater than in a picture, painted in the ordinary manner, without the use of clear gray sheet or film, is greatly facilitated. The picture can be a drawing printed in the usual way on paper, canvas, or linen and the exceptional contrasts be obtained by simply placing a clear gray absorption sheet in front thereof and covering portions of this gray sheet by pigments.

The clear gray sheet or pane need not extend over the entire picture, but may be placed only over those portions that shall be darkened in any manner desired or required by the particular subjects depicted. Only the uncovered portions of the picture give in this case the greatest brilliancy.

A sheet of glass or layer that is not clear but cloudy or mottled will diffusedly reflect the light and therefore itself send out light and hinder the effect desired.

The directed light must be sufficiently strong to overcome surrounding diffused light and so fall on the picture that the reflection from the reflecting surface of the gray plate or layer shall not send directly reflected light to the eye of the observer.

It is unimportant in what manner the picture is made, by painting, drawing or printing, whether many colors are used, or only one color, as gray to black.

In the drawings, in which like parts are similarly designated,

Figure 1 is a vertical diagrammatic section of one construction;

Fig. 2 is a modification thereof;

Figs. 3, 4, 5 and 6 show other constructions.

In Fig. 1, $a$ is the picture frame and $e$ the direction of the light. The picture $c$ printed on paper or painted on canvas has over a portion of its face a clear gray sheet $d$ of glass, celluloid or the like, so that the covered portion of the picture appears very dark compared with the other uncovered portion.

In Fig. 2 there is placed on the front face of the clear gray sheet $d$ a layer $f$ of any pigment, which therefore appears in the same brilliancy as the uncovered portion of the picture $c$.

In Fig. 3 the clear gray sheet $d$ covers the whole picture $c$. All the light portions of the picture $c$ are covered by similar light paintings $f$ provided on the front face of the sheet $d$.

In Fig. 4 a plurality of sheets of clear, gray glass is used, two being shown by way of example, $d$ and $d'$. The front sheet $d$ is shorter than the sheet $d'$ and the latter is shorter than the picture $c$. The observer can view a portion of the picture $c$ directly at $g$; another portion through one thickness of gray glass at $l$, and below this through both thicknesses at $m$.

The face of the first plate $d$ is provided with a high light portion $f$ and the rear face of this plate with a portion $h$ of intermediate tone. The face of the rear plate $d'$ has a high light portion $f'$ and a portion $k$ of intermediate tone.

In Fig. 5 I show the whole painting on the clear gray glass $d$ with high light portions $f$ on the face and a dark portion $h$ on the back thereof.

In Fig. 6 the picture $c$ is covered in its total extent by two clear gray glass plates $d, d'$, so that its pigment layers $n$ are very darkened. On the front face of the first plate $d$ are placed the lighest layers $f$. The layers $k$ of intermediate tone are placed on the back face of the plate $d$ and the front face of the rear plate $d'$. The layer $o$ on the back face of the rear plate $d'$ will appear as dark as the layers $n$ of the picture $c$.

I claim—

1. A picture for directed illumination, portions of the pigment of this picture being covered by a plurality of clear gray sheets, and a portion of the picture included between the sheets.

2. A picture for directed illumination, portions of the pigment of this picture being covered by a plurality of clear gray sheets, a portion of the picture on the back of one sheet and included between the sheets, and another portion on the front of another sheet, and included between the sheets.

3. A picture for direct illumination having in front of pigment thereof a clear gray sheet with portions of the pigment on the front of the sheet and with portions on the back of the sheet to intensify the darkness of colors back of the sheet.

4. A picture for directed illumination comprising a substantially uniformly dark gray sheet of transparent material, the dark pigments of the picture being at the back of the sheet and the light pigments being in the face of the sheet, whereby the dark pigments are rendered darker in appearance to produce a greater contrast with the pigments on the face of the sheet.

5. A picture for directed illumination comprising a uniformly dark and transparent sheet of glass, the dark pigments of the picture being on the back of the glass and the light pigments on the face of the glass, whereby the dark pigments are rendered darker in appearance to produce a greater contrast between the dark pigments and those on the face of the glass.

In testimony that I claim the foregoing as my invention, I have signed my name.

FRITZ BLAU.